(12) United States Patent
Wong

(10) Patent No.: US 6,225,419 B1
(45) Date of Patent: May 1, 2001

(54) POLYAMINE WITH GRAFTED VINYL POLYMERS

(75) Inventor: Pui-Kwan Wong, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/253,378

(22) Filed: Feb. 19, 1999

Related U.S. Application Data

(60) Provisional application No. 60/075,221, filed on Feb. 19, 1998.

(51) Int. Cl.$^7$ ............ C08G 67/02; C08G 73/00; C08G 12/00
(52) U.S. Cl. ............ 525/539; 528/229; 528/392; 528/422; 528/423; 528/492
(58) Field of Search ............ 525/539; 528/229, 528/392, 492, 422, 423

(56) References Cited

U.S. PATENT DOCUMENTS

| | | | |
|---|---|---|---|
| 2,495,286 | 1/1950 | Brubaker | 260/63 |
| 4,024,326 | 5/1977 | Hudgin | 526/11.1 |
| 4,818,811 | 4/1989 | Drent | 528/392 |
| 4,846,406 | 7/1989 | Christy | 239/542 |
| 4,880,865 | 11/1989 | George | 524/449 |
| 5,869,576 | * 2/1999 | Ash et al. | 525/432 |
| 5,952,459 | * 9/1999 | Broekhuis et al. | 528/423 |

FOREIGN PATENT DOCUMENTS

| | | | |
|---|---|---|---|
| 0 004 324 A2 | 9/1979 | (EP) | F16K/7/06 |
| 0 121 965 A2 | 10/1984 | (EP) | C08G/67/02 |
| 0 181 014 A1 | 5/1986 | (EP) | C08G/67/02 |
| 0 372 602 A2 | 6/1990 | (EP) | C08G/67/02 |
| 0 516 238 A1 | 12/1992 | (EP) | C08G/67/02 |
| 0 522 635 A1 | 1/1993 | (EP) | C08G/67/02 |
| WO 93/19114 | 9/1993 | (WO) | C08G/67/02 |

* cited by examiner

*Primary Examiner*—Ana Woodward

(57) ABSTRACT

An grafted polymeric amine is provided, the grafted polymeric amine including: N-substituted 2,5-pyrrolediyl groups incorporated in the backbone wherein the N-substituted 2,5-pyrrolediyl group may be represented by the general formula

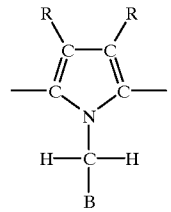

wherein R independently represents a hydrogen or a hydrocarbyl group and B represents the substituent containing at least one primary amino group; and vinyl monomers grafted to a polyketone backbone. This grafted polymeric amine is useful as a component in a wood glue composition.

7 Claims, No Drawings

POLYAMINE WITH GRAFTED VINYL POLYMERS

This application claims benefit of provisional application 60/025,221, filed Feb. 19, 1998.

FIELD OF THE INVENTION

The invention relates to styrene grafted polyamine composition which is useful as a wood glue composition component.

BACKGROUND TO THE INVENTION

Polymers of carbon monoxide and olefins generally referred to as polyketones are well known in the art. The class of linear alternating polymers of carbon monoxide and at least one ethylenically unsaturated hydrocarbon are of particular interest among polyketone polymers. This class of polymers is disclosed in numerous U.S. Patents assigned to Shell Oil Company, exemplified by U.S. Pat. Nos. 4,880,865 and 4,818,811 which are incorporated herein by reference. Polyketone polymers display a well balanced set of mechanical properties which make them particularly useful as engineering thermoplastics.

Other materials having useful properties have also been formed from the combination of various olefins and carbon monoxide. Among these, are relatively low molecular weight materials comprising oligomers or low molecular weight polymers. A monomer other than carbon monoxide and ethene comprises at least 20% wt of the total weight of the polymer. Two olefinic monomers are ordinarily used such as ethene and propene with a relatively low ratio of ethylene to propene (on a weight or molar basis) compared to the linear alternating aliphatic polyketones used as engineering thermoplastics. The monomeric mix will typically include about 50% mole carbon monoxide and about 50% mole of olefins with at least about 30% by weight of the total olefin content comprised of $C_3$ or higher olefins.

These oligomers or low molecular weight polyketones can be employed as thermosets. In such applications they are cured with a curing agent which is generally an amine. Curing may be achieved in the presence of an acid catalyst. Such resins are preferable to existing thermosets in a variety of applications due to reduced environmental nuisances, ease of use, and property mix.

One application of these thermosets is as an adhesive. More particularly, they are useful as glues for wood composites in the preparation of plywood and flake or particle board. The wood composite industry has generally used adhesives such as urea formalde-hyde resins and phenol formaldehyde resins. However, many of the wood composites prepared with them are losing favor in important market segments even though the demand remains generally high for a high impact resistant wood composite with good dimensional stability in the presence of moisture. Much of this is attributable to environmental and safety factors associated with the systems.

Pyrroles may be prepared by a Paal-Knorr reaction by heating a 1,4-dicarbonyl compound with ammonia or primary amines. An example of a Paal-Knorr type reaction may be found in WO 93/19114. In that publication an olefin-carbon monoxide polymer is reacted with an amino acid or a derivative thereof, resulting in polymeric pyrroles having carboxyl functionality or a functionality convertible thereto. It remains desirable to extend the family of polymeric pyrroles having functional groups other than the carboxyl functionality. The amine reactant in the Paal-Knorr reaction need not be a monoamine. For example, in EP-A-0,372,602 the olefin-carbon monoxide polymers are reacted with polyamines. However, these polymeric amines are cross-linked and therefore less applicable in, for example, curable resin compositions.

Use of resin compositions as binder in the preparation of glued wood products such as plywood, particle board, MDF, OSB and laminated beams is known from PCT/EP95/04324. These resin compositions comprise one or more olefin carbon monoxide polymers, optionally of different molecular weight, one or more polyamines such as hexamethylenediamine as curing agent and optionally one or more curing catalysts. They may further comprise a diluent and additional components such as viscosity modifiers, flame retardants, gap filling agents, antioxidants, UV stabilizers and colorants. As is shown in PCT/EP95/04324, these resin compositions compare favorably with curable resins based on urea- or phenolformaldehyde. While these glue systems provide good adhesion, their viscosity and pot life are not ideal for many commercial applications. Lowering their viscosity and increasing their pot life would extend the range of applications for which olefin/CO resins could be used. In particular, they could be made much more suitable for use in the production of plywood and oriented strand board under such conditions.

SUMMARY OF THE INVENTION

These and other objects are accomplished by a polymeric amine which is the product of a diamine having one of the amine groups being more reactive than the other amine group with polymer blend, the polymer blend being a product of a radical polymerization of a vinyl monomer in the presence of an polyketone. This blend includes both grafted and free vinyl polymers, with at least some of the ketone functional groups in a 1,4 configuration providing reactive sites for combination with the amines to form pyrrolediyl units. The grafted polymeric amine therefore comprises: N-substituted 2,5-pyrrolediyl groups incorporated in the backbone wherein the N-substituted 2,5-pyrrolediyl group may be represented by the general formula

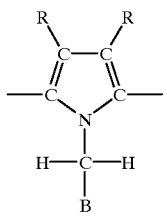

wherein R independently represents a hydrogen or a hydrocarbyl group and B represents the substituent containing at least one primary amino group; and pendant monomer groups. This grafted polymeric amine is useful as a component in a wood glue composition and inclusion of the grafted vinyl polymer results in improved water resistance. In another aspect, the present invention includes a method to produce the grafted polymeric amines, and a wood glue prepared therefrom.

DESCRIPTION OF A PREFERRED EMBODIMENT

The olefin carbon monoxide polymers that are used for the preparation of the polymeric amines and vinyl grafted carbon monoxide-olefin polymers may be perfectly alternating (molar ratio olefin:carbon monoxide equals 1:1 with 1,2-addition of the olefin), semiperfectly alternating (molar ratio olefin:carbon monoxide equals 1:1, but with some olefin addition other than 1,2) or random (e.g., having a carbonyl content of about 30 up to 50 mole percent as disclosed in U.S. Pat. No. 846,406). The theoretical degree of conversion to the pyrrolediyl is limited by the distribution of the carbonyl groups as 1,4-dicarbonyl entities across the polymer chain. Preferably the olefin-carbon monoxide is perfectly alternating or semiperfectly alternating.

The olefin-carbon monoxide polymer may be prepared from ethene, styrene, substituted styrene, an olefinically unsaturated hydrocarbon such as vinyl acetate, ethyl acrylate or N-vinylpyrrolidone, an alpha-olefin, an internal olefin, or a mixture thereof. The polymer is prepared from olefins having from 2 up to 14 carbon atoms, in particular from alpha-olefins having from 2 to 8 carbon atoms. Formation of polymers of still larger olefins is possible but not preferred. More preferably, the olefin-carbon monoxide polymer is a copolymer of carbon monoxide and an olefin selected from ethene, propene and styrene. Particularly preferred are perfectly alternating polymers of ethene and carbon monoxide or styrene and carbon monoxide; perfectly or semiperfectly alternating copolymers of propene and carbon monoxide; perfectly alternating copolymers of ethene/styrene and carbon monoxide; and perfectly or semiperfectly alternating copolymers of ethene/propene and carbon monoxide or propene/styrene and carbon monoxide.

In particular when the olefin-carbon monoxide polymer is an alternating polymer of an alpha-olefin having three or more carbon atoms, the alpha-olefin may be incorporated predominantly in a regioregular fashion or in a regio-irregular fashion. Use of a regio-irregular polymer has the advantage that its viscosity is lower than that of an otherwise comparable (regio-regular) polymer.

The olefin-carbon monoxide polymer may have a molecular weight ranging from 200 to about 500,000 daltons. For a curable resin composition, the polymer suitably has a molecular weight ranging from 500 to 20,000 daltons. Preferably the polymer has a molecular weight in the range of 1,000 to 5,000 daltons, more preferably in the range of 2,000 to 3,500 daltons. In the context of this patent document the molecular weights are number-average molecular weights.

An advantage of olefin-carbon monoxide polymers that have a relatively low molecular weight is that they can be liquid at the temperatures in the range of 10–80° C., which includes temperatures generally used in the processing thereof.

Synthesis of the preferred olefin-carbon monoxide polymer is taught in, for example, EP-A-0,121,965, EP-0,181, 014, EP-A-0,516,238 and EP-A-0,522,635, the disclosures of which are incorporated herein by reference.

Grafting of the vinyl monomer to the polyamine and/or the carbon monoxide-olefin polymer can be conducted with any of the methods used to form graft copolymers. This includes exposure of an appropriate monomer and polymer mix to high energy radiation, heating a suitable monomer in the presence of the copolymer, or reaction of a suitable monomer in the presence of a radical initiator and copolymer. Any other method for graft copolymerizing polymers will be useful in the practice of this invention.

Radical initiation is the most preferred method of preparing the graft polymerized copolymers of this invention. Suitable monomers used in forming grafts by this method include, for example, monoolefinic hydrocarbons such as the styrenes and their derivatives, monolefinically unsaturated esters such as vinyl acetate, vinyl esters of halogenated acids such as vinyl alpha-choroacetate, allyl and methallyl compounds such as allyl chloride, esters of alkenyl alcohols such as beta-ethyl allyl alcohol, halo-alkyl acrylates such as methyl alpha-chloroacrylate, alkyl alpha-cyanoacrylates, fumarates such as diethyl fumarate, monoolefinically unsaturated nitriles such as acrylonitrile, amides of previously mentioned acids such as acrylamide, alkyl ethers such as vinyl methyl ether, vinyl sulfides such as vinyl beta ethoxyethyl sulfide, diolefinically unsaturated hydrocarbons such as 1,3 butadiene, and mixtures of the forgoing compounds. Preferred monomers are styrenes, acrylates, methacrylates, vinyl esters, and vinyl halides. Styrenes are most preferred.

Radical initiators can be either water soluble or oil soluble. Water soluble radical initiators include, for example, potassium persulfate, ammonium peroxydisulfate, potassium peroxydisulfate, sodium persulfate, hydrogen peroxide, and water soluble azo initiators. Oil soluble radical initiators include, for example, benzoyl peroxide, t-butyl perbenzoate and 2,2'-azobis(isobutyronitrile). Water soluble initiators are preferred such as potassium persulfate or azo initiators. The concentration of the free radical initiator is about 0.01 to about 0.5 grams per hundred grams of total monomers.

Redox initiation involving an oxidant, such as potassium persulfate or potassium bromate, and a reductant, such as sodium metabisulfite, or tertiary amines, such as triethyl amine, can also be used to initiate the grafting polymerization, particularly at low temperatures.

The process of producing the graft copolymers of carbon monoxide-olefin and/or the polyamines of this invention (referred to hereafter for simplicity as "the polymers") involves contacting the polymers with an initiator in the presence of monomer used to form the grafted portion of the polymers. Preferably, this is done by introducing the monomer used to form the graft into the oil phase of a dispersion of the polymers and then adding an initiator to the dispersion. A minor amount of agitation such as through stirring or mixing may be applied.

The polymer dispersion to which the graft monomer is added is preferably formed by mixing the polymers with water and a surfactant. Typically, the dispersion will contain more water than polymer on a weight basis although additional aliquots of polymer may be added during emulsification to increase the solids content of the product ultimately formed. In glue applications, a high solids content is desired provided that viscosity can be kept low enough to easily work with the material. Solids contents up to about 60% can be achieved under these conditions using glues made from the graft polymers of this invention.

Any surfactant capable of dispersing the polymers in water can be used provided that the material does not interfere in the initiation of the graft copolymerization. Preferably, the surfactants are nonionic and include, for example, polyalkylene glycols generally, and polyalkylene glycol alkyl ethers, polyalkylene glycol alkyl phenyl ethers, polyalkylene glycol fatty acid esters, sorbitan fatty acid esters, alkyl polyglycoxides, fatty acid dialkanol amides, and the like. Typically, the surfactant will comprise about 3 to 15% weight of the polymers used to form the emulsion but any amount which will serve the purpose of getting both polymers and grafting monomer into an emulsion can be used.

The polymeric amine is the product of amination of a polyketone having 1,4-carbonyl groups with an diamine that has one amine group with a greater reactivity that the second amine group. The polyketone to which the diamine is reacted may be the grafted polyketone, or a different non-grafted polyketone. When a non-grafted polyketone is aminated, it is then combined with polyketone to which the vinly monomers have been grafted. The more reactive amine group of the diamine combines with the ketone groups while the less reactive amine group is available for further reactions. The polymeric amine therefore comprises: N-substituted 2,5-pyrrolediyl groups incorporated in the backbone wherein the N-substituted 2,5-pyrrolediyl group may be represented by the general formula

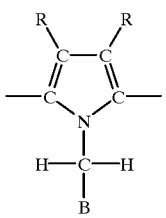

wherein R independently represents a hydrogen or a hydrocarbyl group and B represents the substituent containing at least one primary amino group; and pendant monomer groups.

The substituent B typically is a substituted group of 1 up to 20 atoms having at least one primary amino group attached to it. Suitably, these atoms are carbon atoms, but the substituted group may also contain one or more nitrogen, sulphur or oxygen atoms in its backbone. Preferably, the substituent B has a single primary amino group attached to it that has a lower Paal-Knorr reactivity than aminoethane.

The substituent B may bear other functional groups provided these groups also have a lower Paal-Knorr reactivity than aminoethane. More preferably the substituent B has a sterically hindered primary amino group attached to it.

The expression "sterically hindered" typically refers to atoms or groups larger than hydrogen atoms on adjacent atoms. For instance, in 1,2-propanediamine, the amino group on the 2 position is sterically hindered by the methyl group forming the third carbon atom of the propane backbone, whereas the amino group on the 1 position is not sterically hindered.

Suitable examples of substituents B include: 1-aminoethyl; 1- or 2-aminopropyl; 1-, 2-or 3-aminobutyl, 2-amino-2-methylpropyl, 4amino-2oxapentyl, 7-amino-2,4-diazaoctyl, and 4-amino-3,5-di-tertbutylphenyl.

Each R may independently be a hydrogen atom or a hydrocarbyl group. Suitable hydrocarbyl groups include phenyl and substituted aryl groups; methyl and other alkyl groups of up to 12 carbon atoms; and methoxy and other alkoxy groups of up to 12 carbon atoms.

Preferably the R's in the N-substituted 2,5-pyrrolediyl group are either both hydrogen atoms, or a hydrogen atom and a methyl group respectively.

Besides the N-substituted 2,5-pyrrolediyl group, the novel polymeric amines may comprise substituted or unsubstituted alkadiyl groups and N-substituted 2,5-pyrrolediyl groups having no functionality or a functionality other than a primary amino group.

The polymeric amines of the invention may be represented by the general formula (I)

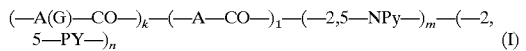
(I)

wherein each A independently represents a substituted or unsubstituted alkadiyl group; and G is the grafted vinyl monomer; k, 1, m and n are integers together representing the number of repeating units p whereby $0 \leq k+1+n<p$ and $p \geq 3$; each 2,5-NPy represents the N-substituted 2,5-pyrrolediyl group wherein the pyrrolic nitrogen atom is substituted with a group having primary amino functionality, and each 2,5-Py represents an N-substituted 2,5-pyrrolediyl group having no functionality or a functionality other than a primary amino group.

Repeating unit "(—A—CO—)" corresponds repeating units of the olefin-carbon monoxide polymer of which the polymeric amines may be prepared. In random olefin-carbon monoxide polymers, as for instance found in U.S. Pat. Nos. 2,495,286, 2,846,406 or 4,024,326 the alkadiyl groups may each independently have from 2 up to 10,000 carbon atoms in the backbone. However, each A of this repeating unit is preferably derived from a substituted or unsubstituted 1,2- or 1,3-alkadiene, more preferably a substituted or unsubstituted 1,2-alkadiene.

Finally, the repeating unit (2,5-Py) is a 2,5-pyrrolediyl group as defined above wherein the pyrrolic nitrogen atom bears, for instance, a hydrogen atom, an alkyl group, an aryl group, an alkenyl group, a tertiary aminoalkyl group or preferably an (N-pyrrole)alkyl group. The latter corresponds to polymeric amines whereby some polymer molecules have been coupled without, however, forming an insoluble polymeric system as in EP-A-0,372,602. For instance, up to 3 of such (N-pyrrole)alkyl groups may be present, although the actual number very much depends on the molecular weight of the polymer.

The integers k, m, l and n may vary widely, as long as k +m +l +n equals p. Suitably, k is in the range of $0 \leq k<0.9p$; l is in the range of $0 \leq l<0.9p$; and m is in the range of $0.1 p<m \leq p$. More suitably l is in the range of $0.2p \leq l \leq 0.5p$, and m is in the range of $0.5p \leq m \leq 0.8p$. The integer n equals p−(+m) which may be zero up to 0.9p, suitably up to 0.3p. The integer p is preferably larger than 10, for instance in the range of 30 to 70.

Preparation the polymeric amines is accomplished by reacting a vinyl monomer grafted carbon monoxide-olefin polymer with a primary amine of general formula (II):

(II)

wherein B has the meaning as set out above, under such conditions as to form the 2,5-pyrrolediyl groups without affecting the functional group attached to the substituent B.

The primary amine of general formula (II) and the 1,4-dicarbonyl groups of the olefin-carbon monoxide polymer will readily react when heated. Reaction temperatures may be selected from ambient temperature up to about 120° C. Higher temperature may be used, but too high temperatures should be avoided as that might adversely influence the olefin-carbon monoxide polymer and/or might cause the functional group attached to substituent B to react. Preferably, the reaction is conducted at a temperature in the range of 50 to 90° C.

It may be beneficial to force the reaction to stop. For example, the reaction could be stopped when a conversion of about 95% based on the primary amine of general formula (II) has been reached. This will avoid cross-linking if the primary amine and its functional group are too reactive. The exact reaction time may be easily found through limited number of simple experiments. Optionally, the functional group of the primary amine of general formula (II) is protected by reaction with a compound that will leave the primary amino group in tact and may be removed from the functional group after the Paal-Knorr reaction.

It may be helpful to use a solvent during the Paal-Knorr reaction, albeit that the polymers in the preferred range of molecular weight will be liquid or soluble in the liquid primary amine at the reaction temperature. Solvents that can be used include for instance toluene. Preferably no solvent is used.

The invention also relates to the use of the vinyl monomer grafted polymeric amines of the invention. These vinyl monomer grafted polymeric amines may be used as curable resin, e.g., when unconverted 1,4-dicarbonyl entities remain, or in curable resin compositions wherein the polymeric amines act as curing agent.

Of particular interest is the use of the vinyl monomer grafted polymeric amines in water-based resin compositions to form a binder in coating and wood glue formulations. The vinyl monomer grafted polymeric amines may be soluble in water by themselves, e.g., when carbonyl functionality is built in, or after quartenization of their amino groups. Waterbased resin compositions are preferred over resin compositions based on volatile organic compounds for environmental reasons.

The present invention also relates to curable resin compositions based on the vinyl monomer grafted polymeric amines as curable resin and/or curing agent, and the use of these curable resin compositions as binder in coating and ambient or heat cure wood glue formulations.

It has now been found that resin compositions based on the vinyl monomer grafted polymeric amines and/or vinyl monomer grafted carbon monoxide-olefin copolymers surpass the earlier compositions in important properties such as pot-life, ease of handling and strength.

Pot-life is an important property of curable resin compositions. For instance, in coating and wood glue formulations it is undesirable if the resin prematurely cures upon standing. The composition of the present invention demonstrates an excellent pot-life.

Ease of handling relates to the viscosity of the curable resin composition. For some applications a high viscosity is required, e.g., when the curable resin composition is applied as a paste, whereas for certain other applications it is preferably water-thin, e.g., when it is sprayed on. The present curable resin composition's viscosity may be tailored to suit its application. For example by using relatively small amounts of water as diluent. Indeed, low viscosities of for instance 1 to 10 Pas are achieved with a solids content of still more than 50% by weight, allowing fast evaporation of the water.

In conventional curable resin wood-glue compositions a problem of over penetration exists. The curable resin is soaked into the wood where it does not add to the overall strength of the cured product. As a consequence, lack of bonding occurs due to starvation. Typically, additional and hence expensive curable resin is used to compensate for this loss. The combination of viscosity with high solids content of the present resin compositions, however, negates the need for additional resin composition, making it price-wise an attractive substitute for these conventional curable resin composition.

The curing rate of the resin composition of the present invention may be easily targeted to match that used in conventional processes. The curable resin composition of the present invention also provides excellent bond strength, combined with a high dimensional stability of the cured product and superior water resistance of the bond. The present resin compositions, for instance, have shown to be extremely suitable for plywood. An extreme endurance test for premium quality plywood comprises prolonged submersion in boiling water (for at least 72 hours). After this test the adhesion of the wood parts, if any, is examined. As is illustrated in the examples, plywood prepared with the present resin compositions passed this test.

The curable resin composition may be similar to that disclosed in PCT/EP95/04324. Thus, they may comprise one or more olefin-carbon monoxide polymers (optionally of different molecular weight), the novel polymeric amine and optionally one or more polyamines such as hexamethylenediamine as curing agent and optionally one or more curing catalysts. They may further comprise a diluent and additional components such as viscosity modifiers, flame retardants, gap filling agents, antioxidants, UV stabilzers and colorants.

The amounts of these-components can be determined by routine experimentation. Typically, the molar ratio of the carbonyl groups in the olefin-carbon monoxide polymer(s) and the primary amine groups of the curing agent is in the range of from 0.25 to 8.0, and suitably in the range of from 0.5 to 4.0.

Suitable quantities of the curing catalyst, if any, range from 0.1 to 15.0% by weight based on the olefin-carbon monoxide polymer. For instance, if weak acids (i.e., having a pKa in the range of from 2 to 5.5, when measured in water at 20° C.) are used, a suitable quantity ranges of from 0.2 to 10.0, in particular 0.5 to 8.0% by weight on the same basis.

The presence of a diluent as well as its nature depends on the use of the curable resin composition and the viscosity that is required. The preferred diluent is water. Water can be use, for instance, in amounts ranging from 0.2 to 200 parts by weight based on 100 parts by weight of the olefin-carbon monoxide polymer.

The curable resin composition may also comprise a polymeric amine having both carbonyl functionality and amino functionality. In that case a separate olefin-carbon monoxide polymer is only optional. Thus, the properties of the olefin-carbon monoxide polymer and the polyamine are combined in a single polymer.

Once the graft polymers of this invention are prepared they may be combined with a catalyst to form glues or adhesives (commonly referred to as binders). Binders so prepared can then be used to join together two or more materials of like or dissimilar character. For example, composites can be formed of wood parts, wood chips, veneers of different species, metals, various polymers, and other materials. Composites formed from the union of two or more wood parts are a most preferred embodiment of this invention.

The species and the form of the wood parts which are used for producing the composites are not critical. The wood may be a high or a low density wood and it may be of deciduous or coniferous origin. Examples of suitable species are oak, chestnut, ash, maple, teak, okoume, mahogany, meranti and pine. Very good results can be obtained with beech, spruce and poplar. The wood does not need any pretreatment other than which may normally be applied when a conventional binder is used. It is generally sufficient to bring the wood parts in the size and shape desired for the type of composite to be produced, for example, by applying mechanical and/or chemical means. Suitably the wood is used in the form of planks, veneers, timber, lamellae, chips or pulp. A combination of two or more species or forms of wood parts may be used, for example, to improve the appearance of the composite.

The wood may be pretreated to increase its durability. An example of such a pretreatment is treatment with superheated steam at 150–220° C. under pressure followed by heating at 100–220° C. at ambient pressure. Another pretreatment is salt impregnation with, e.g., chromium, copper, mercury, arsenic salts or combinations thereof.

Curing of the grafted polymer composition may be carried out in the presence of a curing catalyst or in the absence of any curing catalyst. Advantages of using a catalyst will generally be that the curing can be carried out at a lower temperature or during a shorter period of time. Suitable catalysts are weak acids, in particular acids having a $pK_a$ in the range of from 2 to 5.5, preferably in the range of from 2.5 to 5, when measured in water at 20° C. A preferred class of acids are the organic acids, in particular carboxylic acids, because these are at least to some extent soluble in the grafted polymer composition. Monocarboxylic acids are more preferred due to their generally better solubility in the copolymer. Examples of monocarboxylic acids are acetic acid, nicotinic acid, pivalic acid, valeric acid, benzoic acid and, salicylic acid. Another suitable weak acid is phosphoric acid. Acetic acid is the most preferred catalyst.

The weak acid may be used in small quantities. Suitable quantities are from 0.1 to 15.0% by weight relative to the weight of the grafted polymers. It is more preferred that the weak acid is used in a quantity of from 0.2 to 10.0% by weight. It is most preferred that from 0.5–8.0 % w, on the same basis is used.

The waterborne binder compositions of this invention typically display viscosities which make them easy to work with. Typically these range between about 200 and 5000 mPa.sec at room temperature as measured in a Brooldield viscometer. However, if desirable, a diluent may be used in the grafted polymer composition to facilitate the application of the composition onto the wood parts. A diluent may also improve the compatibility of the catalyst with the grafted polymers. Suitable diluents are, e.g., lower alcohols, lower ketones, lower esters, such as acetates, and lower ethers. The term "lower" refers to diluents with an average of 5 or less carbon atoms per molecule. Preferred diluents are water and lower alcohols, with water being most preferred. Examples of other suitable diluents are acetone, ethyl acetate, methyl propionate and ethylene glycol dimethylether. When the curable resin composition is to be applied, for example, by spraying, the viscosity may suitably be in the range of 100 to 2000 mPa.s, preferably in the range of 500 to 1000 mPa.s, at the temperature of application. Preferably the diluent and the grafted polymers are used in a weight ratio of at least 1:5, in particular in the range of 1:2 to 5:1, more in particular 1:1.5 to 2:1.

It is possible to prepare the curable binder composition in the form of a paste which can easily be spread onto the wood surface in a convenient temperature range, for example, between 10° C. and 50° C.. Such a paste consistency can be accomplished by applying in the binder a relatively small quantity of a diluent, such as water, a lower alcohol or a lower ketone. Typical quantities of diluent are in the range of 0.2–5.0% by weight relative to the weight of the grafted polymers, in particular 0.3–3.0%, more in particular 0.5–1.0% on the same basis. Very favorable results can be obtained by combining the grafted polymers, the types of polymers each having a weight average molecular weight in the range of 200 to 10,000, with water, a surfactant, a radical initiator, and a vinyl polymer. The mixture is then stirred for 15 minutes followed by the addition of a weak acid, which may be used as the curing catalyst, and 0.2–5.0% by weight of a diluent, relative to the weight of the grafted polymers, and heating the obtained mixture at a temperature of between 30° C. and 100° C., preferably between 40° C. and 80° C. The heating time will depend on the temperature selected and may vary suitably between 5 and 50 minutes. Selection of the heating temperature which will provide an optimum consistency and quality of binder is readily obtainable on the basis of routine experimentation. The paste obtained may be applied to the wood at the temperature applied in its preparation but it may also be used at at ambient temperature.

The binder may contain additional components which may be added to modify properties of the binder. Examples of suitable additional components are viscosity modifiers, flame retardants, gap filling agents, antioxidants, UV stabilizers and colorants. For example, clay may be used as a filler or it may be used to decrease the viscosity at high shear rate. A suitable gap filling agent is silica, cereal flour, or coconut shell flour. Antioxidants and UV stabilizers are particularly desirable additives when the composition formed according to this invention is used as a coating material.

The binder may be applied to the wood surface using any conventional technique. The binder, in particular the paste described hereinbefore, may be spread over the surface by using, for example, a brush, a roller, a knife or a blade. It has already been indicated that, after the addition of a suitable quantity of diluent, the binder can also be applied by spraying it by means of a nozzle driven by a compressed gas, for example, as in continuous in-line spraying or by using a paint-sprayer. If desired, when a composite having a soft hand feel is to be produced, the binder may also be applied as a coating at wood surfaces which will be positioned at the outer surface of the composite. It is also possible to coat the cured composite and to cure the coating in an additional curing step.

The quantity of binder relative to the quantity of wood may vary between wide limits and will generally be dependent of the type of composite to be produced. For wood laminates this quantity may be specified per square meter of wood surface covered by the binder or per square meter of joint present between two wood lamellae. Typically, between about 30 and 400 grams of the binder per square meter of joint are used. Preferably, between about 60–120 grams of binder is used.

When the wood composite is a fiber board or a particle board the quantity of binder may more conveniently be related to the weight of the composite. Per kilogram of the fiber board or particle board typically such a quantity of binder is used which is based on 20–150 g, more typically 30–100 grams of the grafted polymer composition. For special applications of fiber boards it may be desired to have the binder present as the continuous phase, in which cases per kilogram of the composite such a quantity of binder may be used which is based on 150–600 grams and in particular 200–500 grams of the grafted polymer composition of the present invention.

After, or simultaneously with, applying the binder onto the wood surface the wood parts are brought together, such that binder resides between wood parts, and curing conditions are subsequently applied. The temperature and the pressure may vary between wide limits. The temperature will generally be dependent of the presence of a curing catalyst. The temperature may suitably be above 50° C., for example, in the range of from 80° C. to 200° C., in particular 100° C. to 160° C.. For laminates typical pressures are in the range of from 1 to 30 kg/cm$^2$, preferably from 2.5 to 25 kg/cm$^2$. In fiber board and particle board applications typical pressures are in the range of from 10 to 150 kg/cm$^2$, preferably from 25 to 100 kg/cm$^2$.

Various types of wood composites can be produced according to this invention, such as fiber board, particle board, for example, wafer board, and laminate, such as plywood and laminated beam or timber. The composites have an excellent impact resistance/strength balance and in the presence of moisture they have an excellent dimensional stability. Hence, the composites can advantageously be applied in the production of doors, parquet flooring, sport articles, such as hockey sticks and electrical appliances, such as switchboards and panels for distributing boxes. Fiber boards which have the binder as the continuous phase can find utility as construction panels.

EXAMPLES

Preparation of polyketone/styrene graft polymer

About 1001 grams of an alternating carbon monoxide-olefin copolymer having 30% ethylene and 70% propylene as the olefins and a number average molecular weight of about 2105, 209.6 grams of styrene, and 4. grams of 2,2'-azobisisobutyronitrile was heated to 60° C. under nitrogen pressure for eighteen hours with stirring. The mixture was then heated to 80° C. under vacuum to remove unreacted styrene monomer. NMR analysis of the product showed it to contain 17.1 percent by weight polystyrene.

Preparation of polyamine from the polyketone/styrene graft polymer

To a resin kettle was added 400 grams of the polyketone/styrene graft polymer, and 123. grams of 1,2-diaminopropane. After the mixture was heated with stirring to a temperature of about 90° C. for three hours, a solution of 50 grams of acetic acid in 710 grams of water was added dropwise at 50° C. over a period of three hours. The resulting mixture was sheated in a Warring blender to yield a stable dispersion with a solids content of 37.3% by weight.

Preparation of a polyamine glue from polyamine with grafted polystyrene and polyketone (glue E1)

To 50 pbw of the polyamine prepared from the polyketoneistyrene graft polymer prepared above was added 18.65 pbw of an alternating carbon monoxide-olefin copolymer having 50% ethylene and 50% propylene as the olefins and a number average molecular weight of about 3548, and 5.95 pbw of water. The mixture was sheared in a homogenizer at 20,000 rpm to yield a 50% by weight solid polyamine glue emulsion with a number average particle diameter of 2.21 μm. Viscosity of the freshly made emulsion was 3467 mPa.s. After 4 weeks at room temperature, viscosity dropped to 2050 mPa.s. The viscosity apparently dropped due to elimination of trapped air bubbles.

Preparation of polyamine glue from polyamine with grafted polystyrene and styrene grafted polyketone (glue E2)

To 50 pbw of the polyamine prepared from the polyketone/styrene graft polymer prepared above was added 18.65 pbw of the polyketone/styrene graft polymer prepared as described above, and 5.95 pbw of water. The mixture was sheared in a homogenizer at 20,000 rpm to yield a 50% by weight solid polyamine glue emulsion with a number average particle diameter of 2.6 μm. Viscosity of the freshly made emulsion was 467 mPa.s. After 4 weeks at room temperature, viscosity dropped to 183 mPa.s. Again, the viscosity apparently dropped due to elimination of trapped air bubbles.

Comparative example (glue C1)

To a resin kettle was added 400 grams of an alternating carbon monoxide-olefin copolymer having 30% ethylene and 70% propylene as the olefins and a number average molecular weight of about 1384, 148.2 grams of 1,2-diaminopropane. After the mixture was heated with stirring to a temperature of about 90° C. for three hours, 60 grams of acetic acid was added to protonate about half of the residual amino groups. The resulting partially protonated polyamine was diluted with 733 grams of water to yield a solution with 40% by weight nonvolatiles.

To 50 pbw of the 40% by weight solids solution prepared above, was added 20 pbw of an alternating copolymer of carbon monoxide and olefin, with the olefins being 50% ethylene and 50% propylene and a number average molecular weight of 3548, and 10 pbw of water. The mixture was sheared in a homogenizer at 20,000 rpm to yield a 50% by weights solids polyamine glue emulsion with a number average particle diameter of 2.3 μm. Viscosity of the freshly made emulsion was 133 mPa.s. After four weeks at room temperature, the viscosity dropped to 67 mPa.s.

Comparative example (glue C2)

To a resin kettle was added 400 grams of an alternating carbon monoxide-olefin copolymer having 30% ethylene and 70% propylene as the olefins and a number average molecular weight of about 2105, 148.2 grams of 1,2-diaminopropane. After the mixture was heated with stirring to a temperature of about 90° C. for three hours, 120 grams of a 50% by weight solution of acetic acid was added to protonate about half of the residual amino groups. The resulting partially protonated polyamine was diluted with 675 grams of water to yield a solution with 39.2% by weight nonvolatiles.

To 50 pbw of the 39.2% by weight solids solution prepared above, was added 19.6 pbw of an alternating copolymer of carbon monoxide and olefin, with the olefins being 50% ethylene and 50% propylene and a number average molecular weight of 3548, and 8.8 pbw of water. The mixture was sheared in a homogenizer at 20,000 rpm to yield a 50% by weights solids polyamine glue emulsion with a number average particle diameter of 1.9 μm. Viscosity of the freshly made emulsion was 5063 mPa.s. After four weeks at room temperature, the viscosity dropped to 2700 mpa.s.

Performance test

Three-layer (nonnotched) crossply wood panels were prepared from ⅙ inch souther pine veneers using four glue samples described above. The panels were hot pressed at 200° C. and 200 psig for 5 minutes. The dosage used for all panels was 65 grams of solids per square meter per single glue line. To evaluate water resistance, one by three inch specimens were cut from the panels and soaked in boiling water for 4 hours. Glue performance was rated according to the number of specimens which did not delaminate after the boiling. Fresh specimens, and specimens which had been aged for four weeks were tested. The results are summarized in the Table below.

TABLE

| | Number of specimens surviving the boil test | |
|---|---|---|
| Glue Formulation | fresh glue | four week aged glue |
| E1 | 2 of 3 | 4 of 8 |
| E2 | 2 of 3 | 8 of 8 |
| C1 | 0 of 3 | 0 of 8 |
| C2 | 0 of 3 | 4 of 8 |

From the Table, it can be seen that wood glues which included grafted styrene passed the boil test two of three times for fresh glue. Grafting styrene onto both the polyketone, and the polyamine component resulted in eight of eight specimens passing the boil test for aged specimens. Without grafting styrene to the glue components, none of the specimens passed the boil test with fresh glue.

I claim:

1. Grafted polymer comprising:

N-substituted 2,5-pyrrolediyl groups incorporated in the backbone wherein the N-substituted 2,5-pyrrolediyl group is represented by the general formula

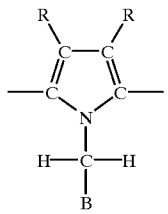

wherein R independently represents a hydrogen or a hydrocarbyl group and B is a substituent containing at least one primary amino group; and vinyl monomers grafted to the polymer.

2. The polymer of claim 1 wherein the vinyl monomer groups comprise styrene.

3. The polymer of claim 1 wherein the Rs are each hydrogen.

4. The polymeric amine of claim 1 wherein B is selected from the group consisting of 1-aminoethyl; 1- or 2-aminopropyl; 1-, 2- or 3-aminobutyl, 2-amino-2-methylpropyl, 4-amino)-2oxapentyl, 7-amino-2,4-diazaoctyl, and 4-amino-3,5-di-tertbutylphenyl.

5. The polymer 4 wherein the polymer further comprises ketone functionality on the backbone of the polymer.

6. The polymer of claim 5 wherein the vinyl monomer groups comprise styrene and the Rs are each hydrogen.

7. The polymer of claim 1 wherein the polymer further comprises ketone functionality on the backbone of the polymer.

* * * * *